Patented June 5, 1951

2,555,446

UNITED STATES PATENT OFFICE 2,555,446

PRODUCTION OF CARBOXYALKYL CELLULOSE ETHERS

William M. Hutchinson, Bartlesville, Okla., assignor to Phillips Petroleum Company, a corporation of Delaware No Drawing. Application June 6, 1947, Serial No. 753,053

14 Claims. (Cl. 260—232)

This invention relates to carboxyalkyl cellulose ethers. In one of its more specific aspects it relates to the production of a gel-free carboxyalkyl cellulose ether product, and in a still more specific aspect it relates to a method for the production of gel-free water dispersible carboxyalkyl cellulose ethers or alkali metal salts thereof.

Carboxyalkyl cellulose ethers, such as sodium carboxymethyl and B-carboxyethyl cellulose ethers, have certain properties which make the compounds valuable industrially. In many instances the utility of these products depends largely upon their dispersibility in water, a property imparted at least in part by the carboxyalkyl groups substituted in the glucose units of the cellulose molecules.

It has been observed that when carboxyalkyl cellulose ethers are dispersed in water, some material usually remains undissolved or undispersed, forming gel-type agglomerates. These insoluble materials may not result from extraneous impurities but may be comprised largely of these carboxyalkyl cellulose ether molecules in which the degree of substitution of the carboxyalkyl groups is low. Removal of these agglomerates, by filtration or other known methods, is extremely difficult to effect. In many instances if allowed to remain, such insoluble material often causes a carboxyalkyl cellulose ether or salt thereof to be unsuitable for their intended use.

An object of my invention is to provide a method for the reduction of the insoluble gel content of carboxyalkyl cellulose ethers or alkali metal salts thereof.

Another object of my invention is to provide a method for the production of gel-free carboxyalkyl cellulose ethers or alkali metal salts thereof.

Still another object of my invention is to provide a method for the production of carboxyalkyl cellulose ethers which are completely dispersible in water.

Still other objects and advantages of my invention will be apparent to those skilled in the art from a careful study of the following disclosure which describes in detail my invention.

I have now discovered a method for the production of ethers of carboxyalkyl cellulose which are completely or substantially completely dispersible in water from carboxyalkyl cellulose ether products which are not completely dispersible by converting the nondispersible constituents to dispersible constituents. Specifically, I carry out my process by first exposing such a material to dispersion conditions in the presence of water whereby dispersible material disperses and any nondispersible material present fails to disperse, then treating this partial dispersion with an agent adapted to transform the nondispersible material to material dispersible in water.

I have found that oxygen yielding compounds serve as such agents. Thus, a carboxyalkyl cellulose ether of a low degree of substitution which ordinarily contains relatively large amounts of gel-forming material, may be treated to produce a substantially completely water dispersible product. Since carboxyalkyl cellulose ether of a low degree of substitution can be made at a much lower cost than one of a higher degree of substitution, the method of my invention may assume a significant economic importance.

According to my process the carboxyalkyl cellulose ether is dispersed in water and agitated while a small amount of an oxygen-yielding compound is added. The mixture is then allowed to stand for from about 1 to 24 hours, after which period a small amount of a suitable reducing agent may be added to destroy any unreacted oxygen-yielding compound. The resultant material may be used for its intended purpose or stored as the water dispersion or it may be precipitated with such a precipitant as alcohol or acetone, filtered and stored as a solid. In this condition the product may easily be packaged for storage or for shipment. The solid may be redispersed in water at any subsequent time for ultimate use. I have found that in some instances the solubilizing action or oxidation step may be accelerated by the use of such a catalyst as ferric chloride, in very small portions.

The oxygen yielding compounds which are suitable for use in the solubilizing step of my invention may be those materials capable of yielding nascent oxygen under conditions of operation. Typical of these compounds are such as hydrogen peroxide, alkali metal peroxides such as sodium peroxide, potassium tetroxide ($K_2O_4$) and the like, organic peroxides such as benzoyl peroxide, salts of hypohalous acids such as sodium hypochlorite, potassium hypobromite, etc., salts of chloric acid such as sodium chlorate, potassium chlorate, salts of persulfuric acid such as sodium or potassium persulfate, salts of permanganic acid such as potassium permanganate, or chromates and other similar compounds. Dichromates should not be used as the oxygen yielding substances in treatment of carboxymethyl cellulose for reasons given hereinbelow.

The quantity of oxygen-yielding compound required to effect solubilizing of the gel-forming substance in a particular sample of carboxyalkyl cellulose ether will vary depending upon the concentration of gel-forming substance present and the particular oxygen-yielding compound employed. For example, a dispersion prepared by adding from 25 to 30 parts of B-carboxyethyl cellulose ether to 1000 parts of water can be rendered substantially gel free by the addition of from one to ten parts of a 30 per cent aqueous solution of hydrogen peroxide. In some instances the addition of the oxygen-yielding compound may be made incrementally, a portion, say half the total amount required, being added initially, the remainder sometime later, for example after about thirty minutes.

In the practice of my invention I have generally preferred to adjust the pH of the dispersion to a value slightly greater than seven before addition of the oxygen yielding substance. Such adjustment can be made by the addition of a base such as sodium hydroxide to the dispersion or to the water before dissolving the carboxyalkyl cellulose ether.

Cellulose consists of recurring anhydroglucose units which usually number above 100 for the material to be designated as cellulose. The anhydroglucose units each have three free hydroxyl groups, the hydrogen of which may be substituted by various carboxyalkyl radicals as shown below:

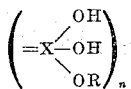

in which R represents a carboxyalkyl radical, X the anhydroglucose residue, and $n$ the number of anhydroglucose units in this particular cellulose molecule.

The anhydroglucose units may be substituted independently of their neighboring units so that, in speaking of the amount of substitution, only the average degree of substitution can be given. A degree of substitution of 1.0 means that for every anhydroglucose unit in the molecule one carboxyalkyl radical has replaced the hydrogen on one free hydroxy group. It is obvious that the degree of substitution could vary from zero, for pure cellulose, to a value of 3.0 when all the free hydroxyl groups have reacted.

Example I

A 3% dispersion of the sodium salt of B-carboxyethyl cellulose ether having a degree of substitution of 0.61 was made by dispensing 60 grams of this material in 2 liters of water. This solution was divided into two equal portions. To one portion of this solution was added 5 milliliters of a 30% solution of hydrogen peroxide. After three hours the B-carboxyethyl cellulose ether was precipitated by treatment with ethyl alcohol, filtered, and the precipitate washed with alcohol and dried. From the dried product 10 milliliters of a 1% dispersion in water was prepared and tested for gel by centrifuging in a 6-inch radius centrifuge at 3000 R. P. M. No detectable insoluble material was observed at the end of 30 minutes of centrifuging.

The second portion of the 3% dispersion was given a treatment similar to that given the first portion except hydrogen peroxide was not added. Ten milliliters of a 1% by weight dispersion in water of this final dried product was prepared and tested in the same centrifuge under similar conditions. A deposition of 3.5 milliliters of insoluble gel was obtained. This 3.5 milliliters volume of gel was removed from the centrifuge tube, dried, and gave a dry weight of 0.05 gram. This weight (0.05 gram) was just half of the 0.1 gram of the B-carboxyethyl cellulose ether used to make the 10 milliliters of 1% dispersion, indicating that the B-carboxyethyl cellulose ether was about 50% water insoluble gel-forming material.

Example II

The experiment of Example I was repeated using 20 grams of the sodium salt of carboxymethyl cellulose ether, having a degree of substitution of 0.4, in 2 liters of water. The centrifuge test on this 1% solution showed 3.5 milliliters of insoluble or rather nondispersible gel in 10 milliliters of suspension. The entire dispersion was then treated with 6 milliliters of 30% hydrogen peroxide and stirred slowly for one hour. A centrifuge test showed that the gel content had been reduced by 43%. By the addition of an additional 6 milliliters 30% hydrogen peroxide and by vigorously agitating the mixture in a Waring blender, the water insoluble gel content was reduced until 10 milliliters of the solution centrifuged for 30 minutes as above described gave no gel precipitate at all.

Other alkali metal salts of the carboxymethyl cellulose ether are the equivalent of the sodium salt.

Example III

A suspension was prepared by adding 40 grams of carboxymethyl cellulose ether, having a degree of substitution of 0.4, to 3000 milliliters of water. Ten milliliters of a 30% sodium hydroxide solution was added to the suspension to raise the pH of the latter to a value greater than 7 and to form the dispersible sodium salt of carboxymethyl cellulose ether. This alkaline dispersion was then divided into two equal portions, one for treatment with an oxygen-yielding substance, and the other for use as a control.

To one portion of the dispersion was added 10 milliliters of an aqueous solution containing 3 milliliters of 30% $H_2O_2$ and 0.2 gram of ferric chloride. This mixture was divided into portions of convenient volume and each portion beaten in a Waring blender for 12 minutes. The several beaten portions were then combined and permitted to stand for 2 hours. To the mixture after standing was added 4,500 milliliters acetone to precipitate the carboxymethyl cellulose ether, which was then filtered, washed with acetone and finally dried. A 1% dispersion of this material was made by dissolving 0.1 gram of the dried product in 10 milliliters of water. This mixture was centrifuged for 30 minutes at 3000 R. P. M. in a 6 inch radius. No perceptible deposition of gel could be seen in the bottom of the centrifuge tube.

The second or control portion of the dispersion was subjected to a similar beating in a Waring blender, allowed to stand for 3 hours, then precipitated with acetone, washed and dried. A sufficient amount of this dried material was dispersed in water to produce a concentration of 1.0%. Ten milliliters of this dispersion was centrifuged under similar conditions and 3.2 milliliters of undispersed gel was obtained. This 3.2 milliliters of gel was removed, dried and weighed. The dried gel weighed approximately 0.05 gram, which was 50% of the 0.1 gram unoxidized material contained in 10 milliliters of a 1.0% by weight dispersion.

It has been found that properties of carboxyalkyl cellulose ethers vary somewhat. For example, the free acid of B-carboxyethyl cellulose ether is sufficiently soluble or dispersible in water that rather concentrated aqueous dispersions can be made at room temperature. In contrast to the dispersability of the ethyl derivative, the free acid of carboxymethyl cellulose ether is quite resistant to dispersion in water. In order for the oxygen-yielding compounds to react with the gel forming material the entire sample, or substantially the entire sample must be in suspension or dispersed. The sodium and potassium carboxymethyl cellulose ethers are easily dispersible in water, and when so dispersed are susceptible to reaction with the herein disclosed oxygen-yielding substances. The carboxymethyl cellulose ether may be converted to the alkali metal salts merely by the addition of aqueous NaOH, KOH or the like.

It will be obvious to those skilled in the art that dichromates should not be used with the carboxymethyl cellulose ether or the sodium carboxymethyl cellulose ether since the dichromates exist and are oxygen-yielding compounds in acid solution only, and in an aqueous acid solution the carboxymethyl cellulose ether is not dispersible or soluble. Thus, the reaction involving the carboxymethyl derivative and the oxygen-yielding compound should take place in an alkaline solution so that the methyl derivative will be water dispersible and therefore susceptible to reaction with the oxygen-yielding compound. The free acid of carboxyethyl cellulose ether is sufficiently dispersible in water or in a dilute acid solution that the solubilizing reaction with the oxygen-yielding substance may be carried out in an acid solution. The acid solution, however, should be sufficiently dilute to avoid degradation of the cellulose molecule. The ethyl derivative may be reacted in a neutral or alkaline solution as well.

It will be understood by those skilled in such art that concentrations, length of time of contacting, and the like, may be varied widely and yet obtain the advantages and results as described herein.

Having disclosed my invention, I claim:

1. A method for the production of a completely water soluble carboxyalkyl cellulose ether selected from the group consisting of carboxyethylcellulose ether and alkali metal salts thereof and alkali metal salts of carboxymethylcellulose ether from said carboxyalkyl cellulose ether containing gel forming material not soluble in water comprising admixing with water a quantity of said carboxyalkylcellulose ether containing gel material insoluble in water, adding to this admixture a quantity of a nascent oxygen yielding compound sufficient to produce said completely water soluble carboxyalkyl cellulose ether.

2. The method of claim 1 wherein the carboxyalkyl cellulose ether is carboxyethyl cellulose ether and the nascent oxygen yielding compound is hydrogen peroxide.

3. The method of claim 1 wherein the carboxyalkyl cellulose ether is an alkali metal salt of carboxymethyl cellulose ether and the nascent oxygen-yielding compound is hydrogen peroxide.

4. A method for the reduction of the gel content of carboxymethyl cellulose ether containing gel material insoluble in water comprising admixing with water said carboxymethyl cellulose ether containing gel material insoluble in water, adding to this admixture a quantity of a basic imparting compound of an alkali metal sufficient to impart to the water of said admixture a pH greater than 7 and adding to this alkaline admixture a nascent oxygen yielding compound.

5. The method of claim 4 wherein the nascent oxygen yielding compound is hydrogen peroxide.

6. A method for the production of a completely water soluble sodium carboxymethyl cellulose ether free from gel forming material insoluble in water from a sodium carboxymethyl cellulose ether having a degree of substitution of carboxymethyl groups in the hydroxyl groups of the anhydroglucose units of 0.4 and greater and containing said gel forming material insoluble in water comprising admixing with water said sodium carboxymethyl cellulose ether having a degree of substitution of the carboxymethyl groups in the hydroxyl groups of the anhydroglucose units of 0.4 and greater and said insoluble gel forming material, and adding to this admixture a quantity of a nascent oxygen yielding compound.

7. The method of claim 6 wherein the nascent oxygen yielding compound is hydrogen peroxide.

8. A method for the production of a completely water soluble carboxyethyl cellulose ether from a carboxyethyl cellulose ether having a degree of substitution of carboxyethyl groups in the hydroxyl groups of the anhydroglucose units of 0.61 and greater and containing material not soluble in water comprising admixing with water said carboxyethyl cellulose ether having a degree of substitution of the carboxyethyl groups in the hydroxyl groups of the anhydroglucose units of 0.61 and greater and containing material not soluble in water, and adding to this admixture a nascent oxygen yielding substance.

9. The method of claim 8 wherein the nascent oxygen yielding substance is hydrogen peroxide.

10. A method for the reduction of the gel content of a carboxyalkyl cellulose ether containing gel material insoluble in water comprising admixing with water said carboxyalkyl cellulose ether containing gel material not soluble in water, adding to this admixture a quantity of a basic compound of an alkaline admixture alkali metal sufficient to impart to the water of said admixture a pH slightly greater than 7 and adding to this a nascent oxygen yielding compound.

11. The method of claim 10 wherein the carboxyalkyl cellulose ether is carboxymethyl cellulose ether and the nascent oxygen yielding compound is hydrogen peroxide.

12. A method for the production of a completely water soluble carboxyalkyl cellulose ether selected from the group consisting of carboxyethylcellulose ether and alkali metal salts thereof and alkali metal salts of carboxymethylcellulose ether from said carboxyalkyl cellulose ether containing material not soluble in water comprising admixing with water said carboxyalkyl cellulose ether, adjusting the pH of the water of said admixture to a value greater than 7 by adding a water soluble basic compound of an alkali metal, adding a small but effective quantity of ferric chloride to said alkaline admixture and adding a nascent oxygen yielding compound.

13. The method of claim 12 wherein the amount of ferric chloride added is 1% based on the weight of the carboxyalkyl cellulose ether and the nascent oxygen yielding compound is hydrogen peroxide.

14. A method for the production of a completely water soluble alkali metal salt of carboxymethyl cellulose ether from a carboxymethyl cellulose ether having a degree of substitution of carboxymethyl groups in the hydroxyl groups of the anhydroglucose units of 0.4 and greater and containing material not soluble in water comprising admixing with water said carboxymethyl cellulose ether having a degree of substitution of the carboxymethyl groups in the hydroxyl groups of the anhydroglucose units of 0.4 and greater and containing material not soluble in water, adjusting the pH of the aqueous phase of said admixture to a pH greater than 7 by adding a water soluble alkali metal hydroxide, adding 1% by weight of ferric chloride based on the weight of the carboxymethyl cellulose ether to the alkaline admixture and incorporating therewith a quantity of hydrogen peroxide.

WILLIAM M. HUTCHINSON.

REFERENCES CITED

The following references are of record in the file of this patent:

UNITED STATES PATENTS

| Number | Name | Date |
| --- | --- | --- |
| 1,860,432 | Richter | May 31, 1932 |
| 1,935,129 | Richter | Nov. 14, 1933 |
| 2,109,496 | Martin | Mar. 1, 1938 |
| 2,135,980 | Malm | Nov. 8, 1938 |
| 2,138,757 | Collings et al. | Nov. 29, 1938 |
| 2,238,912 | McHard et al. | Apr. 22, 1941 |
| 2,249,754 | Ellsworth et al. | July 22, 1941 |
| 2,332,048 | Bock | Oct. 19, 1943 |
| 2,368,527 | Edelstein | Jan. 30, 1945 |